United States Patent [19]

Porter et al.

[11] Patent Number: 4,627,890

[45] Date of Patent: Dec. 9, 1986

[54] CENTRIFUGAL DEVICE

[75] Inventors: John E. Porter, Newcastle upon Tyne; Colin Ramshaw, Norley, both of England

[73] Assignee: Imperial Chemical Industries PLC, London, England

[21] Appl. No.: 443,731

[22] Filed: Nov. 22, 1982

[30] Foreign Application Priority Data

Nov. 24, 1981 [GB] United Kingdom ............... 8135406

[51] Int. Cl.⁴ .................... B01D 3/30; F28D 9/00
[52] U.S. Cl. .................... 202/235; 202/185 R; 202/236; 202/238; 202/180; 159/6.1; 159/13.1; 159/23; 159/DIG. 32; 159/28.2; 165/88
[58] Field of Search .......... 202/236, 235, 238, 185 R, 202/180; 159/6.1, 13.1, 28 P, 23, DIG. 32; 165/88, 92

[56] References Cited

U.S. PATENT DOCUMENTS

| 2,402,307 | 6/1946 | Vannerus ............... 165/88 |
| 2,941,872 | 6/1960 | Pilo et al. . |
| 3,092,180 | 6/1963 | Dahlgren ............... 165/88 |
| 3,110,646 | 11/1963 | Mayhew et al. ........... 202/236 |
| 3,221,807 | 12/1965 | Johansson ............... 165/88 |
| 3,399,708 | 9/1968 | Usher et al. ............ 159/28 P |
| 3,563,710 | 2/1971 | Dew, Jr. et al. ......... 165/88 |
| 3,797,559 | 3/1974 | Paul et al. ............. 165/88 |
| 4,283,255 | 8/1981 | Ramshaw et al. . |

FOREIGN PATENT DOCUMENTS

| 0002568 | of 1979 | European Pat. Off. . |
| 0200055 | 10/1980 | European Pat. Off. . |
| 0757149 | 9/1956 | United Kingdom . |
| 0609542 | 6/1978 | U.S.S.R. . |
| 0731257 | 4/1980 | U.S.S.R. ............... 165/88 |

OTHER PUBLICATIONS

Alfa-Laval; Evaporation Plant Centri-Therm; model CT6; brochure numbered: PD60101E; two pages, unpaginated; published by Alfa-Laval; dated Mar. 1973.
Hickman et al, "Centrifugal Phase-Barrier Recompression Distillation" *Advances in Chemistry Series*, No. 27, pp. 128-146 (1960).

*Primary Examiner*—S. Leon Bashore
*Assistant Examiner*—V. Manoharan
*Attorney, Agent, or Firm*—Cushman, Darby & Cushman

[57] ABSTRACT

In a centrifugal mass transfer device comprising a rotary annular permeable element, annular plates are mounted adjacent the radially inner or outer face of the permeable element and gaseous or liquid material flowing from the permeable element across one surface of the annular plates is cooled or heated by a heat exchange fluid on the opposite surface of the plates. In this way condensed or vaporized material is returned to the permeable element.

6 Claims, 9 Drawing Figures

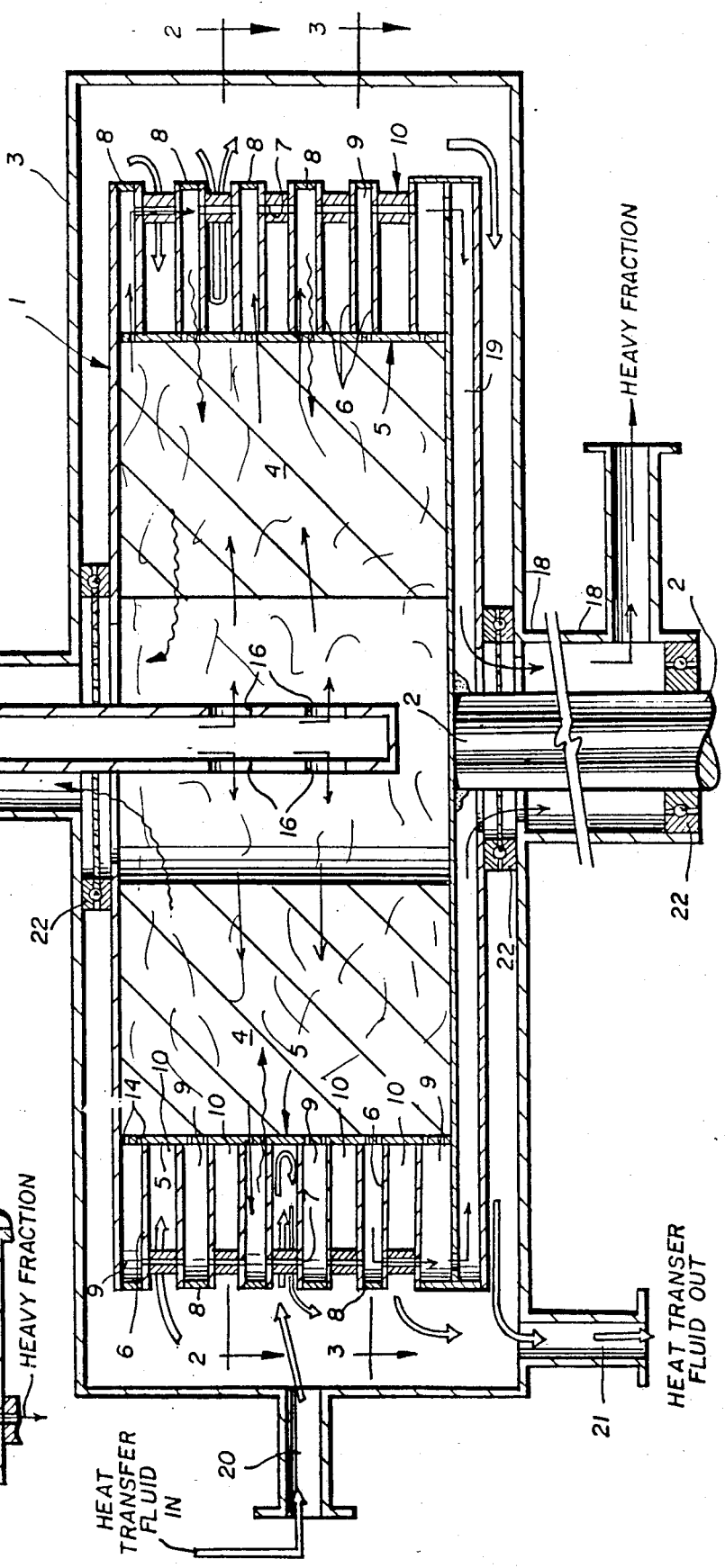
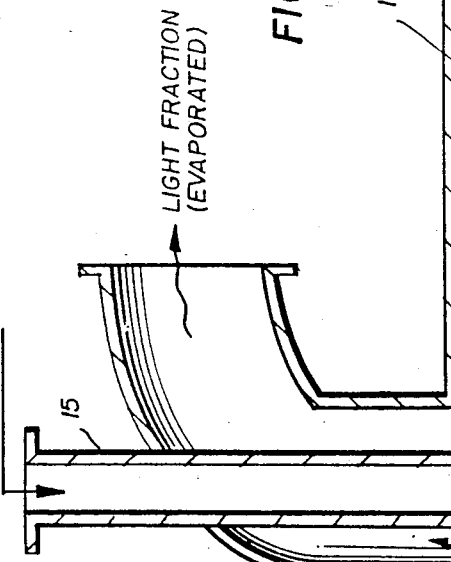
FIG. 1
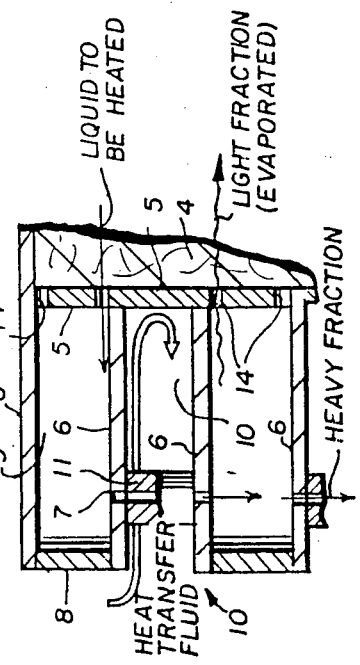
FIG. 1a

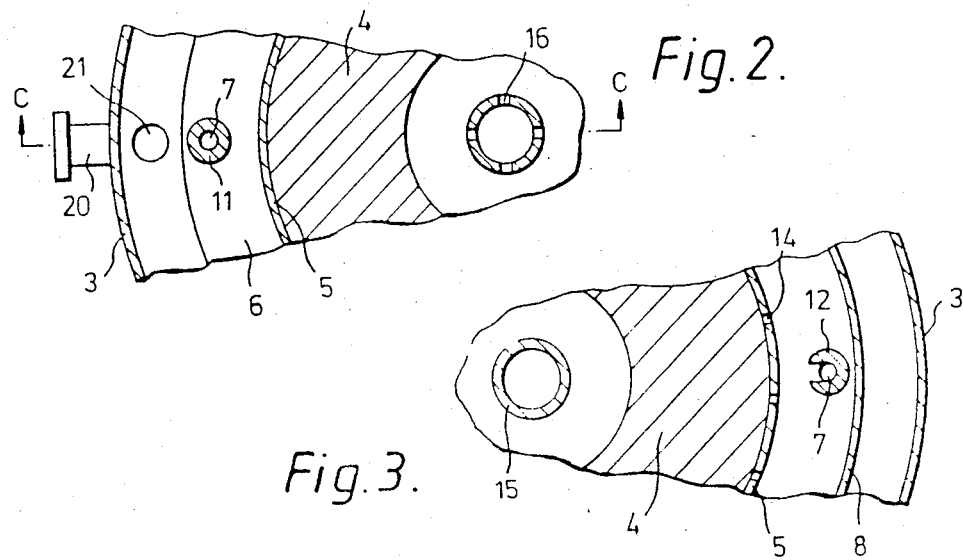
Fig. 2.
Fig. 3.
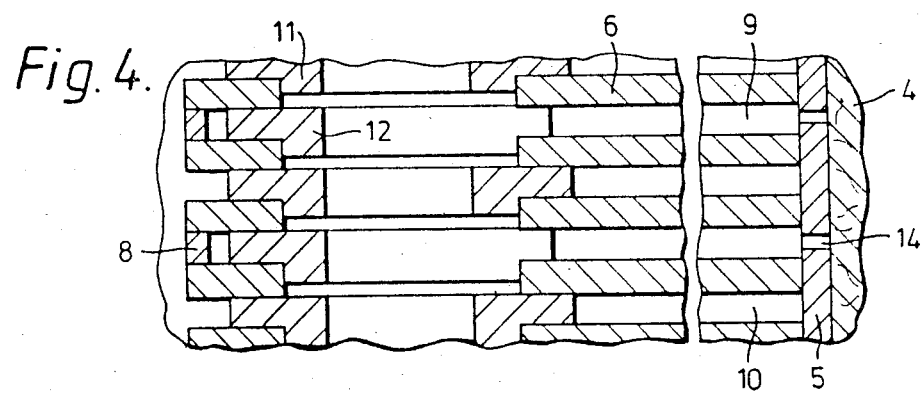
Fig. 4.

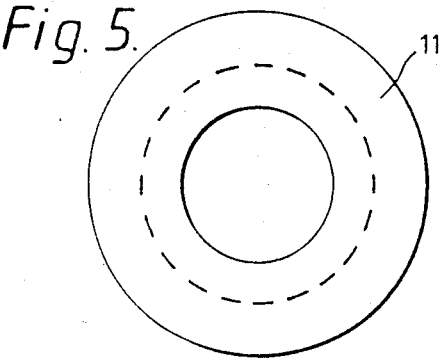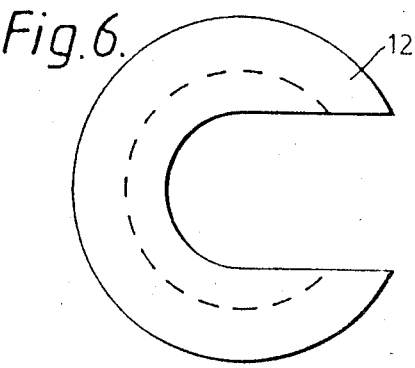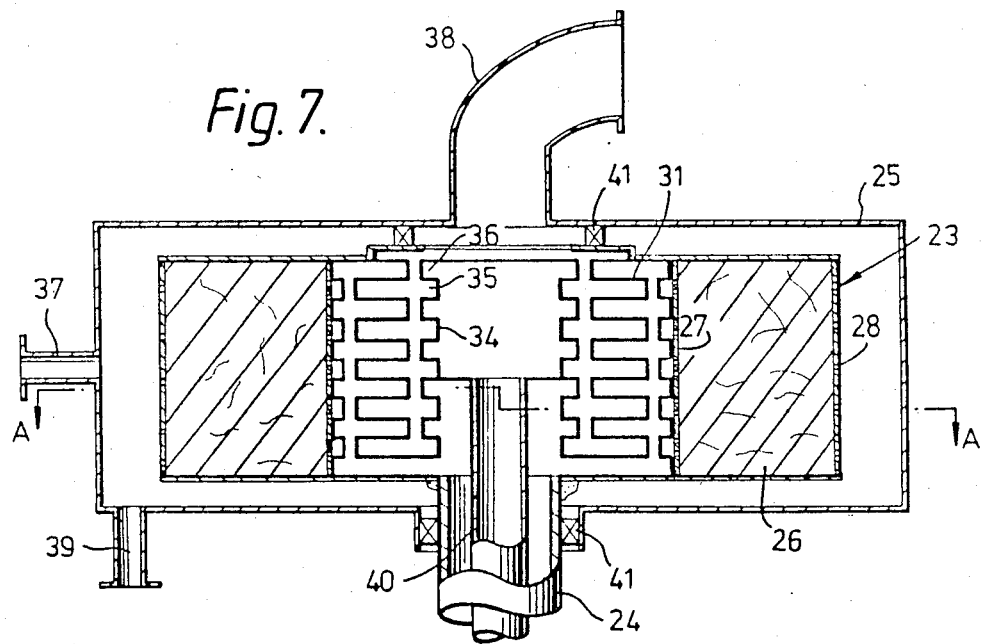

CENTRIFUGAL DEVICE

This invention is concerned with centrifugal mass transfer devices and particularly with centrifugal distillation devices.

Various centrifugal devices for contacting a liquid with a gas or vapour in an annular permeable element, and particularly centrifugal distillation devices, have been proposed, including that described in UK Patent Specification No. 757,149. More recently, we have described in European Patent Publication Nos. 0,002,568 and 0,020,055 centrifugal distillation apparatus having permeable elements of large surface area and thin fibrous construction respectively.

One or more of the fluids which are to be charged to or have been discharged from the permeable element in centrifugal mass transfer devices often have to be heated or cooled immediately prior to charging or immediately subsequent to discharging, which heating or cooling often results in a phase change. For example, where a centrifugal mass transfer device is used for distillation a vapour ("light" fraction) and a liquid ("heavy" fraction) are separately discharged from the permeable element adjacent the inner and outer surface thereof respectively, the liquid into a chamber within which the permeable element rotates. The further treatment to which the liquid and vapour are subjected is dependent on the construction of the distillation device. For example, where the permeable element forms the "bottom" of a stack of permeable elements connected in series, or where the permeable elements is the only permeable element in the distillation device, a first portion of the discharged liquid is collected and a second portion of the discharged liquid is fed to a reboiler where it is vaporised and returned as vapour to the permeable element; where the permeable element forms the "top" of the aforesaid stack, or where the permeable element is the only permeable element in the distillation device, the discharged vapour is withdrawn to a condenser where it is condensed to form a liquid, a first portion of which is collected and a second portion of which is returned to the permeable element.

We have now found that where it is desired to transfer heat to or from a liquid which is to be charged to or has been discharged from the permeable element of a centrifugal mass transfer device such heat transfer can be conveniently effected by providing one or more annular plates adjacent the inner and/or outer surfaces of the permeable element, which annular plates are thin in an axial direction and over a first surface of the or each annular plate the aforesaid fluid flows and over the second surface of the or each annular plate a heat transfer fluid flows. Furthermore, where one or more annular plates is provided adjacent the outer surface of the permeable element, on which plate or plates the discharged liquid is vaporised, the heat transfer fluid can be a process fluid, e.g. high-pressure steam, which is often readily available, and thus it becomes unnecessary to incorporate a separate reboiler in a mass transfer device of the present invention which is used for distillation.

Accordingly, the present invention provides a centrifugal mass transfer device comprising a rotary permeable element formed as an annulus about its axis of rotation; an annular plate which is thin in the direction of said axis, is made of a heat conductive material and is mounted adjacent the radially inner or radially outer face of said permeable element with one surface of said plate in communication with said adjacent face of said permeable element; and means to supply a heat transfer fluid to the other surface of said plate.

A preferred aspect of the present invention provides a distillation device in which a heat transfer fluid supplied to the second surface of the or each annular plate effects condensation of the vapour discharged from the permeable element and/or effects vaporisation of the liquid discharged from the permeable element.

Where, in centrifugal distillation devices according to the present invention, one or more annular plates is provided adjacent the outer surface of the permeable element preferably substantially all the liquid discharged from the permeable element is vaporised on a surface of the or each annular plate and a portion of the vapour is returned to the permeable element and a portion is discharged from the device. It will be appreciated that where a portion of the liquid discharged from the permeable element is not volatilised on a surface, means are necessary to remove this non-volatilised liquid from the device.

Where, in centrifugal distillation devices according to the present invention, one or more annular plates is or are provided adjacent the inner surfaces of the permeable element a first portion of the vapour discharged from the permeable element may be condensed on a surface of the or each annular plate and a second portion of the aforesaid vapour may be discharged directly from the device.

A heat transfer fluid, where it is charged to one or more annular plates adjacent the outer surface of a permeable element in a mass transfer device of the present invention, is preferably a hot condensible vapour which condenses to a liquid on the or each annular plate; where the vapour does not condense on the or each annular plate poor heat transfer is obtained; where the heat transfer fluid is a liquid the "drag" on the rotor is often unacceptably high.

A heat transfer fluid, where it is charged to one or more annular plates adjacent the inner surface of the permeable element in a mass transfer device of the present invention, is preferably a liquid at a suitably low temperature which temperature is increased, by absorbing heat from the condensation of vapour discharged from the permeable element, as the liquid moves across a surface of the or each annular plate.

Preferably the or each annular plate in a mass transfer device of the present invention is disposed substantially transversely to the axis of rotation of the permeable element although we do not exclude the possibility that it may be inclined at an angle of between 0° and 90° to a plane perpendicular to the aforesaid axis.

A surface of an annular plate used in the apparatus of the present invention may be flat but preferably it is contoured. Whilst the annular plate may be corrugated, preferably the contours are formed by protrusions from or indentations in the plate. Where contours are present they are preferably disposed substantially transversely to the flow of fluids across the aforesaid surface and more preferably they are concentric with the axis of rotation. The contours, where they are present, are shaped and disposed to cause perturbations of the liquid film, for example a spray of liquid may be generated thereby or the liquid film remains in contact with the surface of the annular plate over substantially all of the surface by using, for example, the "Coanda" effect.

Where an annular plate used in a device of the present invention is of uniform thickness the aforesaid uniform thickness is generally less than about 5 millimeters and preferably is between 0.1 and 0.5 millimeters.

The material of construction of an annular plate used in a device of the present invention should have good thermal conductivity, for example mild steel, aluminium, or copper.

It will be appreciated that the heat transfer fluid does not directly contact the vapour or the liquid discharged from the permeable element.

Preferably a plurality of annular plates are provided adjacent the outer and/or inner surface of the permeable element and where a plurality of annular plates are employed they are preferably at least substantially parallel.

Where a plurality of annular plates is used they are closely adjacent to one another to form narrow passageways and preferably the axial depth of the passageways between adjacent annular plates is less than about 50 mm and more preferably is between 0.25 mm and 5 mm.

Where a plurality of annular plates are present on a surface of the permeable element, means are provided to remove at least a portion of the product on plates from the apparatus via a common discharge means. Typically, a manifold is formed between appropriate spaces between the plates, which manifold leads to a discharge orifice.

The invention will be further described by reference to the accompanying drawings which show, by way of example only, two embodiments of the present invention. In the drawings:

FIG. 1 illustrates, in schematic axial section, a first distillation apparatus which incorporates the feature of the present invention;

FIG. 2 is part of a sectional view taken along the line A—A of FIG. 1;

FIG. 3 is part of a sectional view taken along the line B—B of FIG. 1;

FIG. 4 is part of a sectional view, to an enlarged scale, taken along the line C—C of FIG. 2;

Figure 8:
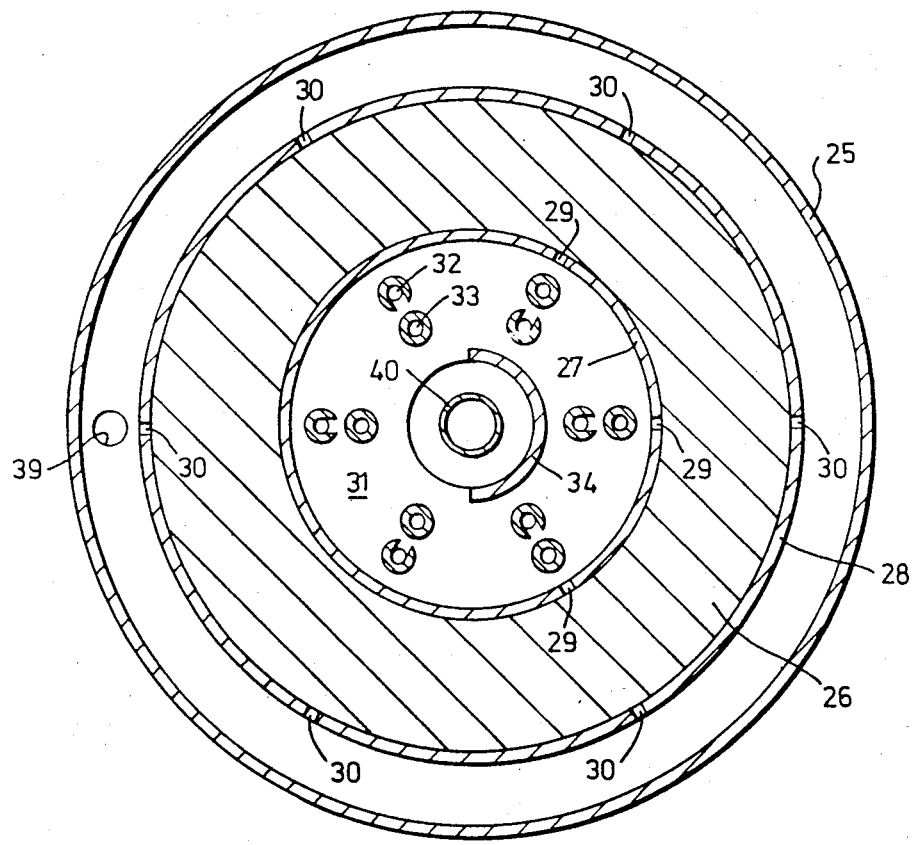

FIGS. 5 and 6 illustrate in enlarged plan view the spacers 11 and 12 respectively of FIGS. 2 to 4;

FIG. 7 illustrates, in schematic axial section, a second distillation apparatus which incorporates the feature of the present invention; and FIG. 8 illustrates a sectional view taken along the line A—A of FIG. 7.

In FIGS. 1-6, a rotor 1, mounted on a shaft 2 by means of which it is rotated in a housing 3, contains a permeable element 4 distributed as an annulus around its axis and surrounded by the outer wall 5 of the rotor. Annular plates 6 formed with orifices 7 are attached to the outer wall 5. Alternate spaces between the annular plates 6 are sealed at their outer perimeter by rims 8 to form sealed space 9 and open space 10.

Circular washers 11 and C-washers 12 are mounted in orifices 7 to form a set of manifolds (only two of which are shown) which joins the sealed spaces 9. Orifices 14 in the wall 5 provide fluid-flow contact between the permeable element 4 and the sealed spaces 9. A liquid feed pipe 15, provided at its lower end with orifices 16 projects into the centre of the permeable element and is surrounded by a vapour discharge pipe 17. The shaft 2 is rotatably mounted in a vapour off-take pipe 18 which leads via channels 19 in the base of the rotor 1 to the manifolds. The housing 3 is provided with ports 20 and 21 for the entry and exit respectively of a heat transfer fluid. Gas-tight seals 22 allow rotation of the rotor 1 and shaft 2 within the housing 3.

In operation, the rotor is rotated, a liquid is fed via feed-pipe 15 and orifices 16 to impinge on the permeable element 4 and moves outwards under centrifugal force through the permeable element 4 and is discharged through the orifices 14 into the spaces 9 where it flows across one surface of each of the plates 6. A hot condensible vapour is fed through port 20 into the housing and enters the spaces 10. The hot vapour loses a portion of its heat, condenses to form a liquid which moves radially outwards through the open spaces 10 as a thin film on one surface of each of the plates 6, and is then removed via the port 21. The heat lost by the heat-transfer liquid vapourises the liquid in spaces 9 and a first portion of the vapour so produced is discharged from the apparatus via the set of manifolds and pipe 18 to be collected as the "heavy" fraction. A second portion of the vapour so produced passes back through the permeable element where it contacts and equilibrates with liquid moving radially outwards and a portion of the vapour emerges from the inner face of the permeable element and is expelled via pipe 17 to be collected as the "light" fraction.

In FIGS. 7 and 8, a rotor 23, mounted on a hollow shaft 24 by means of which it is rotated in a housing 25, contains a permeable element 26 distributed as an annulus around its axis and disposed between walls 27 and 28 which are provided with orifices 29 and 30 respectively. Annular plates 31 provided with two concentric circles of orifices 32 and 33 are mounted adjacent the inner wall 27. Alternate spaces between the plates 31 are sealed with rims 34 to form sealed spaces 35 and open spaces 36. Circular washers 11 and C-washers 12 are mounted in orifices 32 and 33 to form two concentric sets of manifolds, the inner one of which sets joins the sealed spaces and the outer one of which sets joins the open spaces. Orifices 29 in the inner wall 27 provide fluid-flow contact between the permeable element 26 and the sealed spaces 35 and orifices 30 in the outer wall 28 allow fluids to be charged to and discharged from the permeable element. The housing 25 is provided with a vapour feed-pipe 37, a vapour take-off pipe 38 and a liquid discharge pipe 39. Hollow shaft 24 also acts as a feed-pipe for a heat-transfer liquid and mounted therein and concentric therewith is a discharge pipe 40 for the heat transfer liquid. Gas-tight seals 41 allow rotation of the rotor 23, shaft 24 and pipe 40 within the case 25. Shaft 24 and pipe 40 are provided with appropriate seals (not shown) to allow heat transfer liquid to be respectively fed to and discharged from the rotor.

In operation, the rotor is rotated, a vapour is fed via feed-pipe 37 and orifices 30 to the permeable element 26 and moves inwards through the permeable element 26 and is discharged through the orifices 29 into the spaces 35. From the spaces 35 a first portion of the vapour is discharged, via the inner set of manifolds and the take-off pipe 38, as the "light" fraction.

A heat-transfer liquid at an appropriate low temperature is fed through hollow shaft 24 into the spaces 36 and the outer set of manifolds. The heat-transfer liquid absorbs heat as it flows across the surface of each of the plates 31 and is then expelled via tube 40. The heat absorbed by the heat-transfer liquid was lost by a second portion of the vapour discharged from the permeable element, which condensed as a liquid in the spaces 35. The condensed liquid flows radially outwards under centrifugal forces across one surface of each of the plates 31 through ports 29 and into the permeable element 26 where it contacts and equilibrates with vapour flowing rapidly inwards. A portion of the liquid emerges from the outer surface of the permeable element, flows through the ports 30 and is expelled via pipe 39 to be collected as the "heavy" fraction.

It will be readily appreciated that the centrifugal mass transfer device according to the present invention, in its various embodiments including those illustrated in the accompanying drawings, possesses significant advantages over earlier centrifugal mass transfer devices. For example, when the device is used for distillation purposes, the annular plates adjacent the outer and inner faces of the rotary element function as reboiler and condenser respectively and may therefore render unnecessary the provision of such pieces of separate equipment normally associated with distillation operations. Since the high mass transfer rates achievable with centrifugal devices make them more compact than conventional mass transfer equipment, they tend to be used in particular in situations where their compactness is of advantage, for example off-shore; in such situations, the possibility of avoiding the need for a separate condenser and/or reboiler is particularly attractive.

Another advantage lies in the fact that the annular plate "reboiler" and/or "condenser" is directly adjacent the permeable element, thus shortening the total residence time of the material to be distilled and making it possible to use the device for the distillation of heat-sensitive materials.

Furthermore, the compactness of the device overall, combined with the shortness of the path to the "reboiler" and/or "condenser", mean that the total inventory of the equipment is substantially less than for conventional mass transfer equipment; the device according to the invention is therefore of particular value for the treatment of hazardous materials.

We claim:

1. In a centrifugal mass transfer device comprising a rotary fluid-permeable element formed as an annulus about its axis rotation, the improvement comprising:
    at least one annular plate which is thin in the direction of said axis, has two opposite surfaces, is made of a heat conductive material and is mounted adjacent a cylindrical face of said permeable element with one said surface of said plate in fluid transfer communication with said adjacent face of said permeable element and the other said surface isolated from fluid transfer communication with said adjacent face of said permeable element;
    and means to supply a heat transfer fluid to said other surface of each said plate while isolating such fluid from direct contact with said one surface of each said plate.

2. The device of claim 1, wherein said annular plate is one of a plurality of plates, spaced apart along said axis rotation, extending substantially transverse to said axis and being disposed substantially parallel to each other.

3. The device of claim 2, wherein alternate spaces between plates are: (a) in communication with said permeable element but not in communication with said heat transfer fluid supply means, and (b) in communication with said heat transfer fluid means but not in communication with said permeable element.

4. The device of claim 3, wherein each plate is contoured.

5. A distillation device, comprising:
    a rotary permeable element formed as an annulus about its axis of rotation and having a radially outer face and a radially inner face;
    vapourising means, which
    (a) is in the form of a plurality of annular plates, mounted in parallel, axially-spaced relationship adjacent the radially outer face of said rotary permeable element, each of said annular plates being thin in the direction of the said axis and being made of a heat conductive material, alternate spaces between said plates being in fluid flow communication with said adjacent radially outer face such that a liquid discharged through said adjacent radially outer face flows into said alternate spaces but other spaces between said plates being isolated from fluid flow communication with said adjacent radially outer face, and
    (b) is provided with means to supply a heat transfer fluid to said other spaces between said plates while isolating said heat transfer fluid from fluid flow communication with said alternate spaces, so that the said heat transfer fluid loses a portion of its heat which heat flows across the thickness of each of the said plates and vapourises at least a portion of said liquid in the said alternate spaces at least some of which vapour flows into from said alternate spaces into said permeable element;
    condensing means to condense vapour discharged from the radially inner face of the permeable element;
    means to supply a fluid feedstock for said distillation to said rotary permeable element and
    means to remove a lighter product fraction resulting from distillation of said liquid and a heavier product fraction resulting from distillation of said liquid from the device.

6. A distillation device comprising:
    a rotary permeable element formed as an annulus about its axis of rotation and having a radially inner face and a radially outer face;
    condensing means which
    (a) is in the form of a plurality of annular plates, mounted in parallel, axially spaced relationship adjacent the radially inner face of said rotary permeable element, each of said annular plates being thin in the direction of the said axis and being made of a heat conductive material, alternate spaces between said plates being in fluid flow communication with said adjacent radially inner face such that vapour discharged through said adjacent radially inner face flows into said alternate spaces but other spaces between said plates being isolated from fluid flow communication with said adjacent radially inner face, and
    (b) is provided with means to supply a heat transfer fluid to said other spaces bewteen said plates where it absorbs heat while isolating said heat transfer fluid from fluid flow communication with said alternate spaces,
        (i) which heat is lost by a portion of the said vapour in the said alternate spaces as it liquifies forming a liquid at least some of which flows from said alternate spaces into said permeable element and
        (ii) which heat passes through the thickness of said annular plates to the heat transfer fluid;
    vapourising means to vapourise liquid discharged from the radially outer face of the permeable element;
    means to supply a fluid feedstock for said distillation to said rotary permeable element; and
    means to remove a lighter product fraction and a heavier product fraction from the device.

* * * * *